(12) United States Patent
Ogawa et al.

(10) Patent No.: US 10,261,500 B2
(45) Date of Patent: *Apr. 16, 2019

(54) NUMERICAL CONTROLLER CONTROLLING MACHINING TOOL BASED ON SKIVING INSTRUCTION

(71) Applicant: FANUC Corporation, Minamitsuru-gun, Yamanashi (JP)

(72) Inventors: Shuji Ogawa, Minamitsuru-gun (JP); Motohiko Ito, Minamitsuru-gun (JP); Yukihiro Hiraishi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 352 days.

This patent is subject to a terminal disclaimer.

(21) Appl. No.: 14/993,137

(22) Filed: Jan. 12, 2016

(65) Prior Publication Data

US 2016/0209824 A1    Jul. 21, 2016

(30) Foreign Application Priority Data

Jan. 21, 2015    (JP) ................................. 2015-009507

(51) Int. Cl.
*G05B 19/19* (2006.01)
*G05B 19/4155* (2006.01)
(Continued)

(52) U.S. Cl.
CPC ...... *G05B 19/4155* (2013.01); *G05B 19/4093* (2013.01); *G05B 19/4166* (2013.01); *G05B 2219/36342* (2013.01); *Y02P 90/265* (2015.11)

(58) Field of Classification Search
None
See application file for complete search history.

(56) References Cited

U.S. PATENT DOCUMENTS

2003/0089204 A1    5/2003    Schreiber et al.
2005/0222706 A1    10/2005    Muraki et al.
(Continued)

FOREIGN PATENT DOCUMENTS

CN    1677292 A    10/2005
CN    103707132 A    4/2014
(Continued)

OTHER PUBLICATIONS

Hideo Matsunaga, "Newest technology of gear working machines and gear cutting that meet high precision demand; [Machine edition]; High speed and high precision machining machine for internal gears; Gleason Power Skiving Machine" Machine Technology, Japan, Nikkan Kogyo Shimbun Ltd., May 26, 2014, vol. 62, No. 6, p. 47 to p. 49.

(Continued)

*Primary Examiner* — Raj R Gupta
(74) *Attorney, Agent, or Firm* — Drinker Biddle & Reath LLP

(57) ABSTRACT

A numerical controller calculates a tool path and a tool feed rate based on a cutting point path and a cutting point feed rate instructed by a skiving instruction when a block read from a machining program is the skiving instruction and controls a machining tool based on the calculated tool path and the tool feed rate.

4 Claims, 3 Drawing Sheets

(51) Int. Cl.
  *G05B 19/4093* (2006.01)
  *G05B 19/416* (2006.01)

(56) References Cited

U.S. PATENT DOCUMENTS

| | | | |
|---|---|---|---|
| 2014/0121822 A1 | 5/2014 | Suzuki et al. | |
| 2015/0158100 A1 | 6/2015 | Vogel | |
| 2015/0355621 A1* | 12/2015 | Ikeda | G05B 19/4093 700/159 |
| 2016/0016242 A1 | 1/2016 | Stadtfeld et al. | |
| 2016/0041545 A1* | 2/2016 | Koide | G05B 19/19 700/187 |
| 2018/0004184 A1* | 1/2018 | Nagano | G05B 19/182 |

FOREIGN PATENT DOCUMENTS

| | | |
|---|---|---|
| CN | 103785903 A | 5/2014 |
| JP | H01-15912 A | 6/1989 |
| JP | 2002-263903 A | 9/2002 |
| JP | 2014-516808 A | 7/2014 |
| WO | WO-01/43902 A2 | 6/2001 |
| WO | WO-2013-088884 A1 | 6/2013 |
| WO | WO 2014-176169 A2 | 10/2014 |
| WO | WO-2014155723 A1 | 10/2014 |

OTHER PUBLICATIONS

Decision to Grant a Patent dated Nov. 22, 2016 in Japanese Patent Application No. 2015-009507 (3 pages) with an English Translation (3 pages).
The Notification of the First Office Action dated Nov. 1, 2017 in Chinese Patent Application No. 2016100379252 (5 pages) with an English translation (7 pages).
Weck, M.; Brecher, Ch.: Werkzeugmaschinen 4—Automatisierung von Maschinen und Anlagen, 6. Auflage.
Tschätsch_PraxisZerspantechnik_2005_Volltext.
Office Action dated Apr. 23, 2018 in German Patent Application No. 10 216 000 409 (7 pages) with an English translation (7 pages).

* cited by examiner

◀·····  INSTRUCTED CUTTING PATH
◀― ― ―  TOOL PATH IN RESPONSE TO INSTRUCTION

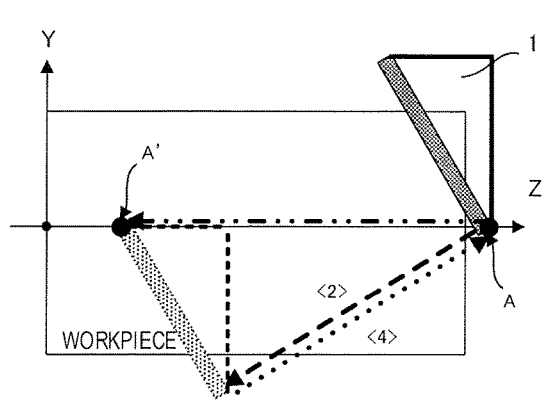
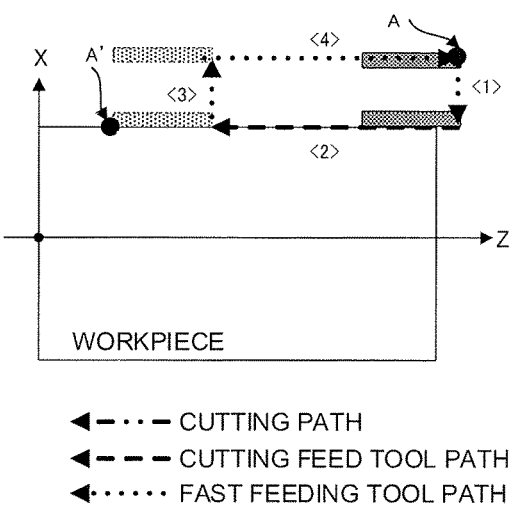
◀—·—· CUTTING PATH
◀— — — CUTTING FEED TOOL PATH
◀······ FAST FEEDING TOOL PATH
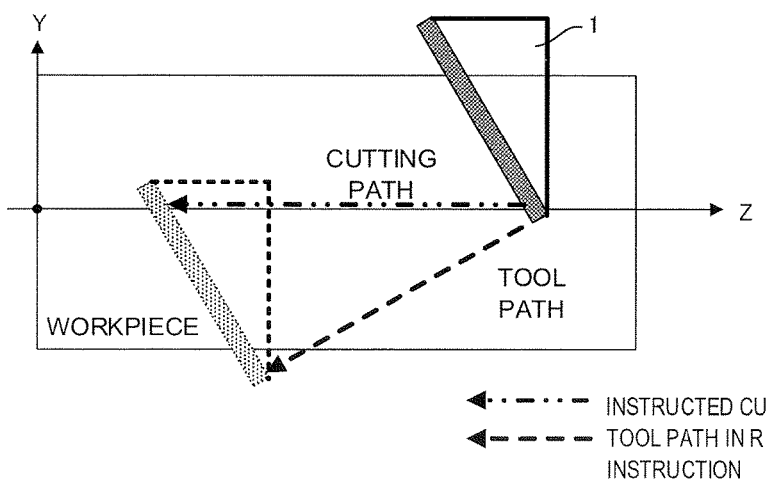
◀·—·—· INSTRUCTED CUTTING PATH
◀— — — TOOL PATH IN RESPONSE TO INSTRUCTION

NUMERICAL CONTROLLER CONTROLLING MACHINING TOOL BASED ON SKIVING INSTRUCTION

RELATED APPLICATION DATA

This application claims priority under 35 U.S.C. § 119 and/or § 365 to Japanese Application No. 2015-009507 filed Jan. 21, 2015, the entire contents is incorporated herein by reference.

BACKGROUND OF THE INVENTION

1. Field of the Invention

The present invention relates to a numerical controller, and particularly, to a numerical controller that controls a machining tool by analyzing a skiving instruction.

2. Description of the Related Art

A skiving process indicates a machining method of cutting a workpiece by means of a turning tool, wherein the turning tool is fed in a tangential direction of the workpiece to cut the workpiece (JIS standard B0106 0.209). In a skiving process of a turning machine, a workpiece is machined while the Y-axis is moving, using a tool having a straight blade disposed obliquely with respect to the rotation axis of the rotating workpiece (for example, see WO2001/043902).

When such a skiving process is performed by a conventional numerical controller, there is a need to instruct the Y-axis movement in association with the Z-axis movement. FIG. 6 is a diagram illustrating a cutting path of a cutting process performed on the workpiece during the skiving process and a tool movement path during the cutting process performed along the cutting path.

As illustrated in FIG. 6, in the skiving process, the cutting path of the cutting process for the workpiece is set in the rotation axis direction (the Z-axis direction), and the tool performs the cutting process while moving in a direction the straight blade faces (or in a direction substantially orthogonal to the straight blade). For this reason, the tool path is set in the direction of the resultant vector in the Z-axis direction and the Y-axis direction, inclined with respect to the rotation axis direction.

When an operator creates a machining program for the skiving process, two axes, the Z and Y axes, are instructed at the same time by a cutting feed command in order to allow the tool to move along the tool path as illustrated in FIG. 6. However, since a contact point (a cutting point) between the workpiece and the tool is changed depending on the Y-axis position, the instructed tool path does not match the actual machining position. For that reason, the operator needs to create a machining program by calculating the movement amount in the Z and Y axes so as to obtain a desired cutting path, and hence the operator feels a large burden.

Further, since the instructed feed rate is the synthesized velocity in the Z and Y axes and the cutting point is apt to move in the Z-direction depending on the Y-axis position, it is difficult to instruct the cutting point speed to be a desired speed.

SUMMARY OF THE INVENTION

Here, an object of the invention is to provide a numerical controller capable of reducing a load of creating a machining program for a skiving process by an operator.

A numerical controller according to the present invention controls a machining tool performing a skiving process of cutting a rotational symmetrical surface of a rotating workpiece by a tool, based on a machining program. The machining program is adapted to include a skiving instruction capable of designating a cutting point movement path during the skiving process. The numerical controller comprises: an instruction program analyzing unit analyzing the machining program and determining whether a block read out from the machining program is a skiving instruction or not; and a skiving instruction data calculating unit calculating a tool path and a tool feed rate based on a cutting point path and a cutting point feed rate instructed by the skiving instruction when the instruction program analyzing unit determines that the read block is the skiving instruction. The machining tool is controlled on the basis of the tool path and the tool feed rate calculated by the skiving instruction data calculating unit.

The numerical controller may further include a tool data storing unit storing tool angle data indicating a tool angle with respect to the rotation axis of the workpiece and effective tool blade edge data indicating an effective tool blade edge. And the skiving instruction data calculating unit may calculate the actual tool path and tool feed rate based on the cutting point path and the cutting point feed rate instructed by the skiving instruction and the tool angle data and the effective tool blade edge data stored in the tool data storing unit.

The skiving instruction may include a skiving cycle instruction that instructs a repeated skiving process.

In the invention, since the cutting point movement amount and the cutting point feed rate in the skiving process can be directly instructed by the machining program and the Y-axis instruction in the skiving process is not needed, a load of creating the machining program for the skiving process by an operator is reduced.

BRIEF DESCRIPTION OF THE DRAWINGS

The forgoing and other objects and feature of the invention will be apparent from the following description of preferred embodiments of the invention with reference to the accompanying drawings, in which:

FIGS. 5A and 5B are diagrams illustrating the movement of the tool when a skiving cycle instruction is performed; and FIG. 6 is a diagram illustrating a relation between the cutting path when a workpiece is cut during the skiving process and the movement path of the tool when the cutting process is performed along the cutting path.

DETAILED DESCRIPTION OF THE PREFERRED EMBODIMENTS

Hereinafter, an embodiment of the present invention will be described with reference to the drawings. First, a technical outline of the present invention will be described.

In the present invention, a skiving instruction capable of directly designating instruction data for a cutting point movement path is introduced as an instruction in a turning machine. For example, the skiving instruction is given in a manner described below.

G01Z_F_;

Z_: movement amount of a cutting point performing skiving process

F_: feed rate of a cutting point performing skiving process

The skiving instruction may be performed by preparing a G-code dedicated for a skiving process. Alternatively, the skiving instruction may be automatically performed when the cutting feed G01 is instructed in a state where a skiving tool is selected.

Further, when the skiving instruction is used, the skiving instruction may be made in a state where the tool has been moved in advance to a machining start position. At this time, Y-axis may be allowed to automatically move to a skiving start position (a position where one end of an effective blade edge is located at a position of Y=0).

When the skiving instruction is made so that the movement amount and the feed rate for the cutting point are instructed, a numerical controller of the present invention calculates a tool path and a tool feed rate based on the instruction data, and controls the driving of the tool based on the calculation result.

Figure 1:
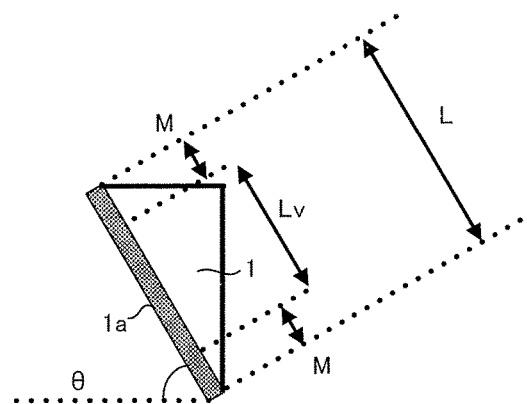
FIG. 1 is a schematic diagram of a tool used in a skiving process.

FIG. 1 is a schematic diagram of the tool used for a skiving process.

In the skiving instruction of the turning machine, a tool 1 is installed so that a straight blade 1a is inclined by a predetermined angle θ with respect to the rotation axis direction (the Z-axis direction) of a workpiece. An area of a blade edge length margin M from the end of the straight blade 1a is not used for cutting process. That is, a portion obtained by excluding the blade edge length margins M of both ends of the straight blade from the blade edge length L becomes an effective blade edge length Lv.

Figure 2:
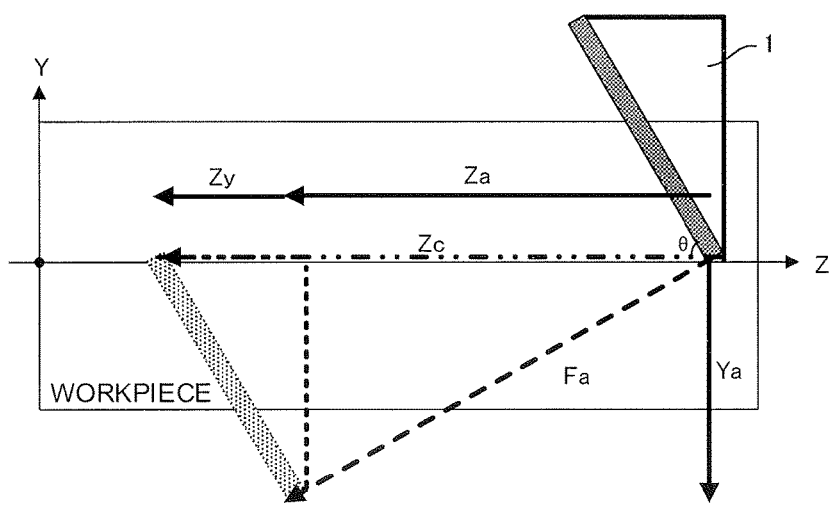
FIG. 2 is a diagram illustrating a relation between a cutting path and a tool path when a movement amount Zc and a feed rate Fc for a cutting point are instructed by a skiving instruction during a skiving process using a tool of FIG. 1.

FIG. 2 illustrates a relation between a cutting path and a tool path when a movement amount Zc and a feed rate Fc for the cutting point are instructed by the skiving instruction during the skiving process using the tool 1 illustrated in FIG. 1.

As illustrated in FIG. 2, the respective values can be obtained by the following equation (1) on the assumption that the tool movement amount in the Z-axis direction is Za, the tool movement amount in the Y-axis direction is Ya, and the synthesized tool feed rate in the Z-axis direction and the Y-axis direction is Fa when the tool is moved so that the cutting point movement amount becomes Zc and the cutting point feed rate becomes Fc.

Tool movement amount in Y-axis direction $Ya=Lv \times \sin\theta$

Cutting point movement amount in Z-axis direction in association with the movement of tool in Y-axis direction $Zy=Lv \times \cos\theta$ Tool movement amount in Z-axis direction $Za=Zc-Zy$ Tool feed rate in Z-axis direction $Fz=Fc-(Zy/Zc) \times Fc$ Tool feed rate in Y-axis direction $Fy=(Zy/Zc) \times Fc \times \tan\theta$ Synthesized tool feed rate $$Fa=\sqrt{Fz^2+Fy^2} \quad (1)$$

The skiving process can be performed by controlling the movement of the tool using the tool movement amount Za in the Z-axis direction, the tool movement amount Ya in the Y-axis direction, and the synthesized feed rate Fa obtained as described above. Further, tool data such as a tool angle θ and an effective blade edge length Lv may be fixed values in case where a tool as a control target is determined, but may be appropriately set in accordance with the tool so that the tool data can be set by a numerical controller in advance. At that time, the effective blade edge length Lv can be freely set by changing the blade edge length margin M.

Figure 3:
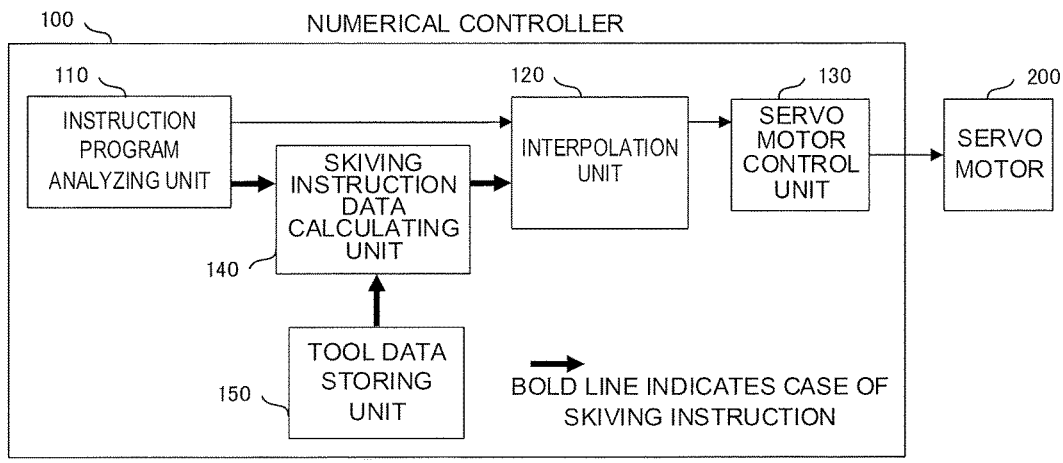
FIG. 3 is a functional block diagram of a numerical controller according to an embodiment of the invention.

FIG. 3 is a functional block diagram of a numerical controller according to an embodiment of the present invention. Further, the bold arrow of FIG. 3 indicates the flow of the data when the skiving instruction added in the present invention is performed.

A numerical controller 100 of the present invention includes an instruction program analyzing unit 110, an interpolation unit 120, a servo motor control unit 130, a skiving instruction data calculating unit 140, and a tool data storing unit 150.

The instruction program analyzing unit 110 sequentially reads out an instruction block of a machining program stored in a memory (not illustrated) and analyzes the read instruction block. When it is found, as a result of the analysis, that the read block is a general instruction, instruction data is generated based on the analysis result and is output to the interpolation unit 120. On the other hand, when the read block is a skiving instruction block, the instruction data instructed by the block is output to the skiving instruction data calculating unit 140.

The interpolation unit 120 generates interpolation data to be obtained by applying interpolation calculation on the points on the instruction path in an interpolation cycle, based on the instruction data output from the instruction program analyzing unit 110 or the skiving instruction data calculating unit 140 and outputs the generated interpolation data to the servo motor control unit 130. Then, the servo motor control unit 130 relatively moves the workpiece with respect to the tool by driving a servo motor 200 based on the interpolation data input from the interpolation unit 120.

The skiving instruction data calculating unit 140 calculates the tool path and the feed rate by Equation (1) described above based on the skiving instruction data input from the instruction program analyzing unit 110, generates tool instruction data based on the calculation result, and outputs the tool instruction data to the interpolation unit 120. The numerical controller 100 is equipped with the tool data storing unit 150 which stores tool data such as a tool angle or an effective blade edge length, and the skiving instruction data calculating unit 140 calculates skiving instruction data by using the tool data acquired from the tool data storing unit 150.

In addition, the tool data stored in the tool data storing unit 150 may be set by an operator through an input unit (not illustrated) such as a control panel when the machining is started or may be set by the instruction of the machining program. Further, the tool data of the tool attached to the machining tool may be automatically acquired and set.

Figure 4:
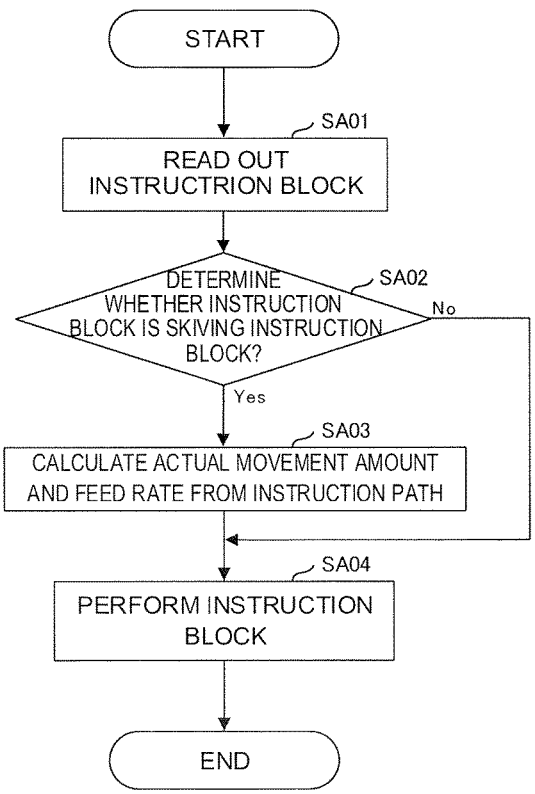
FIG. 4 is a flowchart illustrating a flow of a process performed by the numerical controller of FIG. 3.

FIG. 4 is a flowchart illustrating a flow of a process performed in the numerical controller 100 according to the embodiment of the present invention. In FIG. 4, the processes in step SA01 and step SA04 are similar to the process of the related art, and the processes in step SA02 and step SA03 are processes that are added in the present invention. The processing is explained below according to respective steps.

[step SA01] The instruction program analyzing unit 110 reads out an instruction block of a machining program from a memory (not illustrated).

[step SA02] The instruction program analyzing unit 110 analyzes the instruction block read out in step SA01 and determines whether the instruction block is a skiving instruction block or not. In the case of the skiving instruction block, the process proceeds to step SA03. Otherwise, the process proceeds to step SA04.

[step SA03] The skiving instruction data calculating unit 140 calculates a tool path and a tool feed rate according to Equation (1) based on the data input from the instruction program analyzing unit 110 and the data acquired from the tool data storing unit 150.

[step SA04] The interpolation unit 120 performs an interpolation process based on the instruction data generated from the instruction block and the servo motor control unit controls the driving of the servo motor based on the interpolation data.

So far, the operation of the numerical controller 100 has been described based on the skiving instruction, but the skiving process is often continuously performed by the repeated operation of the tool. So, in the present invention, a skiving cycle instruction can be introduced, in addition to the skiving instruction that instructs a single operation. For example, such a skiving cycle instruction is generated as below.

$G90X\_Z\_F\_;$

X_, Z_: cutting end point A' of skiving process

F_: feed rate of a cutting point performing skiving process

In the present invention, when an instruction is given so that a skiving process is performed in a cycle, the tool is moved to a cutting start point A in advance, and the cutting end point A' (X_Z_) and the cutting feed rate F for the cutting point are instructed by using a cycle instruction of skiving process.

FIGS. 5A and 5B are diagrams illustrating the movement of the tool when the skiving cycle instruction is performed. FIG. 5A illustrates the movement of the tool when the workpiece is viewed from the X-axis direction and FIG. 5B illustrates the movement of the tool when the same workpiece is viewed from the Y-axis direction. In these drawings, reference symbol A denotes the cutting start point, reference symbol A' denotes the cutting end point, and <1> to <4> indicate the operations of the tool. The operations of the tool will be described below.

Operation <1>: The tool moves by rapid traverse from the cutting start point A to the X-axis instruction coordinate value. At the same time, the tool moves by rapid traverse to the skiving start position on the Y-axis.

Operation <2>: The Z-axis and Y-axis movements are controlled from the movement amount and the feed rate for the cutting point, in a manner similar to the case of skiving instruction that instructs a single operation.

Operation <3>: The tool moves by rapid traverse to the X-axis start position.

Operation <4>: The tool moves by rapid traverse to the Z-axis and Y-axis start position.

By introducing such a skiving cycle instruction, an operator can easily generate a program for instructing a skiving process in a cycle.

While the embodiment of the present invention has been described above, the present invention is not limited to the above-described embodiments, and may be appropriately modified into various forms. For example, in the description of the functional block diagram of FIG. 3, the skiving instruction data calculating unit 140 is an independent function unit, but may be configured to be included in the instruction program analyzing unit.

The invention claimed is:

1. A numerical controller that controls a machining tool performing a skiving process of cutting a rotational symmetrical surface of a rotating workpiece by a tool, based on a machining program, wherein the machining program is adapted to include a skiving instruction capable of designating a cutting point movement path during the skiving process, and wherein the numerical controller comprises:

non-transitory computer readable memory;

one or more hardware processors coupled to the non-transitory memory and configured to read instructions from the non-transitory memory to cause the numerical controller to perform operations comprising:

analyzing the machining program and determining whether a block read out from the machining program is a skiving instruction or not;

calculating a tool path and a tool feed rate based on a cutting point path and a cutting point feed rate instructed by the skiving instruction when the analyzing determines that the read block is the skiving instruction, the instructed cutting point path including a machining tool movement amount in a plurality of axes; and controlling the machining tool on the basis of the calculated tool path and the calculated tool feed rate so that the machining tool performs the skiving process of cutting the rotational symmetrical surface of the rotating workpiece, wherein the movement amount and the cutting point feed rate in the skiving process are directly instructed by the machining program so that performing a movement instruction with respect to a tangential direction of the rotating workpiece in the skiving process is not needed, thus reducing a load of creating the machining program for the skiving process by an operator.

2. The numerical controller according to claim 1, further comprising:

storing tool angle data indicating a tool angle with respect to the rotation axis of the workpiece and effective tool blade edge data indicating an effective tool blade edge, wherein the calculating calculates the actual tool path and tool feed rate based on the cutting point path and the cutting point feed rate instructed by the skiving instruction and the stored tool angle data and effective tool blade edge data.

3. The numerical controller according to claim 2, wherein the skiving instruction includes a skiving cycle instruction that instructs a repeated skiving process.

4. The numerical controller according to claim 1, wherein the skiving instruction includes a skiving cycle instruction that instructs a repeated skiving process.

* * * * *